(No Model.)

H. A. ALDEN.
HORSE HAY RAKE.

No. 406,864. Patented July 16, 1889.

Witnesses

Inventor
Horace A. Alden
By Price & Fisher
His Attys.

UNITED STATES PATENT OFFICE.

HORACE A. ALDEN, OF PEORIA, ILLINOIS, ASSIGNOR TO THE ACME HAY HARVESTER COMPANY, OF SAME PLACE.

HORSE HAY-RAKE.

SPECIFICATION forming part of Letters Patent No. 406,864, dated July 16, 1889.

Application filed April 27, 1888. Serial No. 272,011. (No model.)

*To all whom it may concern:*

Be it known that I, HORACE A. ALDEN, a citizen of the United States, residing at Peoria, in the county of Peoria, State of Illinois, have invented certain new and useful Improvements in Horse Hay-Rakes, of which I do declare the following to be a full, clear, and exact description, reference being had to the accompanying drawings, forming part of this specification.

My present invention has relation to that class of rakes commonly known as "sweep-rakes," wherein the gathering of the hay is effected by means of long teeth that project in front of a rake head or frame mounted upon suitable traveling wheels, and more particularly does it relate to that type of such rakes wherein the rake-head is provided with a rearwardly-extending frame hinged thereto and carrying a driver's seat and mechanism whereby the rake-teeth can be permitted to ride freely upon the surface of the ground, or can be caused to more closely bear upon the ground and follow the irregularities thereof, or can be lifted completely away therefrom. An example of this type of rake is illustrated in Letters Patent No. 355,674, granted to me and to John E Kirk, January 11, 1887.

The object of my present invention is to provide improved mechanism whereby the operator can readily control the movements of the rake-teeth either during the raking operation or when passing to or from the field. This object of invention I have attained by the novel features of construction hereinafter described, illustrated in the accompanying drawings, and particularly defined in the claims at the end of this specification.

Figure 1:
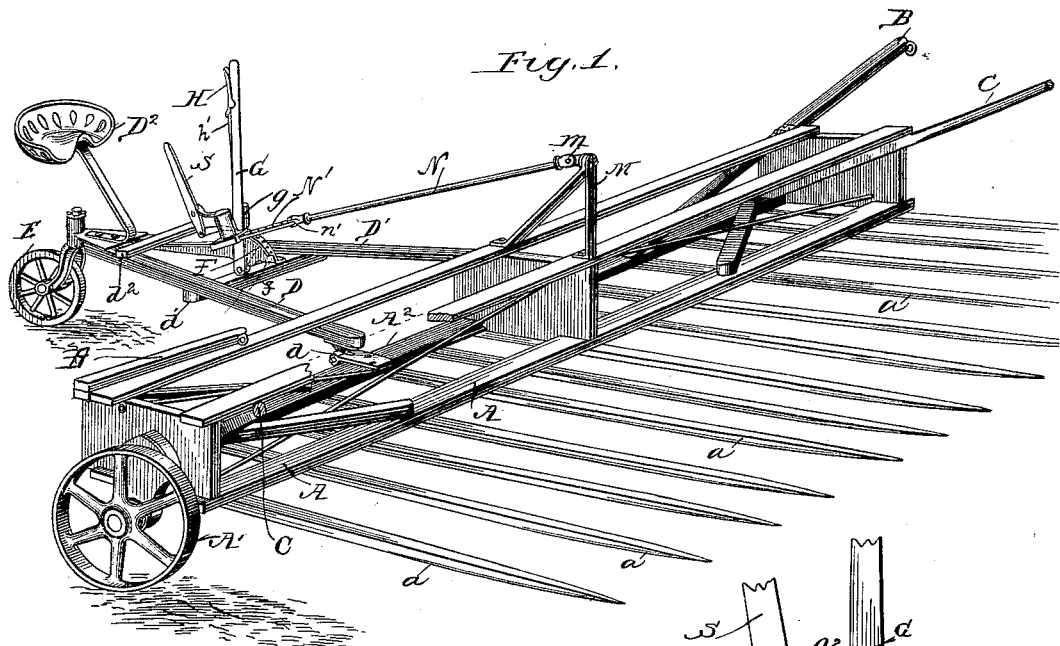
Figure 3:
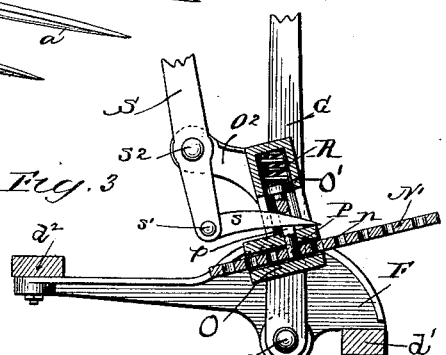
Figure 2:
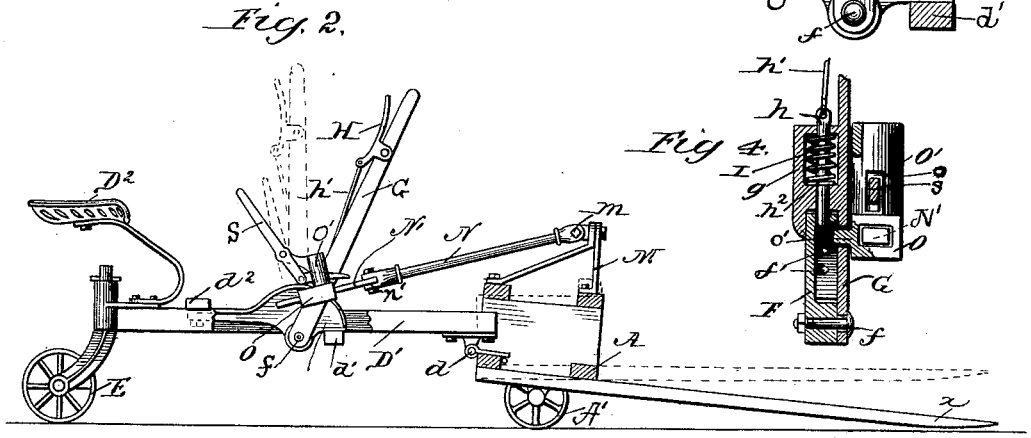
Figure 4:
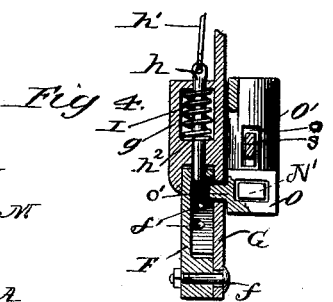

Figure 1 is a perspective view of a sweep-rake having my improvements applied thereto. Fig. 2 is a view partly in side elevation and partly in longitudinal section. Fig. 3 is an enlarged fractional view, in vertical longitudinal section, through a ratchet-plate and slide-block, parts being shown in side elevation. Fig. 4 is an enlarged detail view through the segment-plate and the operating-lever, parts being shown in side elevation.

A designates the rake head or frame, from which project forwardly the usual long teeth $a$, this frame or head being preferably mounted upon suitable traveling wheels A', and being by preference drawn by horses attached one at each side of the rake to draft-bars B, and forwardly and outwardly projecting poles C. To the cross-beam $A^2$ of the rake-head is suitable hinged—as, for example, at $d$—the seat-frame formed of converging bars D and D', braced by a suitable cross-bar $d'$, the rear end of this frame being provided with a driver's seat $D^2$ and foot-bar $d^2$, and being sustained upon a suitable traveling or caster wheel E. This seat-frame also serves the purpose of sustaining the improved lifting mechanism next to be described. This lifting mechanism comprises a segment-plate F, the forward end of which is bolted to the cross-bar $d'$, while its rear end is bolted to a foot-bar $d^2$, although it is obvious that this plate may be mounted upon the frame in other suitable manner.

To the lower part of the segment-plate F is pivotally connected, by a journal-pin $f$, the operating-lever G, upon one side of which is fastened or formed a casing $g$, through which passes a draw-bolt $h$, controlled by the grip-rod $h'$ and its handle H, that is pivotally connected to the lever G near its upper end. This bolt $h$ is pressed into normal engagement with the holes or teeth $f'$, formed in the flanged periphery of the segment-plate F, by means of a spring I, located within the casing and bearing upon a suitable shoulder $h^2$ of the bolt. Upon the top of the rake frame or head A is mounted a suitable bracket or standard M, to the upper end of which is pivotally connected, as by the knuckle-joint $m$, the shifting-rod N, to the rear end of which is attached, as at $n'$, (or, if desired, formed in piece therewith,) a ratchet plate or bar N', that passes through a slide-block O, that carries a suitable dog or pawl P, adapted to engage with the perforations or teeth $n$ of this plate. This dog or pawl P, in the construction shown, is pressed normally downward by means of the coiled spring R, held within an extension O' of the slide-block O, and in this dog or pawl is formed a slot $p$, through which passes a wedge-shaped lifting-plate $s$, that passes also through slots $o$ in the extension O', and is pivotally connected, as at $s'$, to the lower end of a releasing or throw-off lever S, that is pivotally mounted, as at $s^2$, upon an arm $O^2$, extending from the casing O'.

The slide-block O is provided with a suitable stud or pin $o$, that enters a hole formed in the operating-lever G near its lower end, and serves to cause the slide-block to move at all times in unison with such lever.

From the foregoing description the operation will be seen to be as follows: When the rake is gathering its load of hay the relative position of parts will be that illustrated by full lines in Fig. 2 of the drawings—that is to say, the releasing or throw-off lever S will have been moved backward in such manner as to force the wedge-shaped lifting-plate $s$ through the pawl P and cause the disengagement of such pawl from the ratchet-plate N'. When the releasing or throw-off lever S has been thus moved backward and has caused the wedge-plate to lift the pawl P, the coiled spring R, forcing the upper part of the pawl P against the top edge of the wedge-plate, will serve to hold the releasing or throw-off lever in its retracted position. Under these conditions the forwardly-projecting teeth $a$ of the rake rest upon the surface of the ground, and by reason of the hinged connection $d$ between the rake-head and the seat-frame, and by reason also of the knuckle-joint $m$ between the shifting-rod N and the bracket M, the teeth of the rake can move freely over the irregularities of the ground, the ratchet-plate being at such time free to slide within the slide-block O. When, however, an obstruction is met with, or is seen by the operator, over which the points of the teeth are to be raised, the releasing or throw-off lever S will be moved forward, as shown by dotted lines in Fig. 2, and by full lines in Fig. 3, so as to permit the pawl P to engage with the ratchet-plate N', and thus effect a connection between such ratchet-plate and the operating-lever G, after which the operating-lever G will be drawn backward to the position shown by dotted lines, Fig. 2, the draw-bolt $h$ having been first lifted out of engagement with the segment-plate F by the grip-handle H. This backward movement of the operating-lever will draw backward the slide-block O and the shifting-rod N, and consequently will cause the rake-head to tip backward more or less upon the axle of its supporting-wheels A' as a center, and it is plain that points of the teeth $a$ of the rake-head will thus be lifted the distance necessary to clear the obstacle. So, also, when the machine is passing to or from the field, or at any other desired time, the rake-teeth can be lifted away from the ground by the mechanism above defined, and when the teeth are thus lifted they will be retained in their elevated position by the engagement of the draw-bolt $h$ with the holes or teeth of the segment-plate F, which checks the further movement of the operating-lever and consequently of the slide-block and the shifting-rod. If it is desired to raise the teeth a considerable distance above the ground, the operating-lever G and the slide-block O will be moved forward after the throw-off lever has raised the pawl P out of engagement with the rack-plate, so as to cause this pawl P to engage with the holes $n$ of the plate nearest the end of the shifting-rod N, and it is obvious that by then moving the operating-lever backward the points of the teeth can be raised to any required height, and this, too, without bringing the operating-lever inconveniently near the driver's seat. When it is desired to cause the points of the rake-teeth $a$ to follow very closely any irregularities of the surface of the ground, it is only necessary for the operator, after having thrown the pawl P into engagement with the ratchet-plate N in the manner above defined, to force the operating-lever forward, thereby causing the shifting-rod N to push forward the bracket M, thus forcing the points of the rake-teeth $a$ into close contact with the surface of the ground. It will thus be seen that by my present invention a very simple and effective means is provided whereby the rake-teeth can be permitted to ride freely over the surface of the ground or can be lifted therefrom or depressed into close contact therewith with very little effort on the part of the driver.

It is obvious that any other suitable means than that shown may be employed for connecting the seat-frame with the rake-head so long as a hinge action is secured at some point between such frame and the rake-teeth.

While in the above-mentioned Letters Patent No. 355,674 is shown a construction for enabling the driver to control the movements of the rake-teeth much more effectively than I believe was possible with prior devices of that type, still my present invention I regard as an advance over that set forth in said patent, especially in the following particulars, to wit: In my present construction not only the pawl that serves to engage with the ratchet-plate is so connected with or carried by the operating-lever as to be moved back and forth thereby, but a spring also sustained by and movable with said lever serves to force the pawl into engagement with the ratchet. So, also, the releasing device is sustained by the operating-lever, so as to be moved in unison therewith and with its co-operating parts. Moreover, in my present construction the releasing mechanism differs from that set forth in the above-mentioned Letters Patent in the respect that in this construction a wedge-plate is employed for lifting the pawl out of engagement with the ratchet-plate—a construction which I have found by practice to be much superior to that set forth in said Letters Patent, particularly in that it allows not merely a more ready release of the ratchet-plate, but enables the pawl to be more easily held out of engagement with the ratchet-plate when desired. Again, the construction hereinbefore set out differs from that set forth in the above-mentioned Letters Patent in the respect that the operating-lever is provided with a slide-block pivotally connected thereto, through which the ratchet-plate can pass, the pivotal connection of this slide-block allowing it to respond at times to the movement of the operating-lever without danger of binding upon the ratchet-plate.

Having thus described my invention, what I claim as new, and desire to secure by Letters Patent, is—

1. In a horse hay-rake, the combination, with a rake-head having forwardly-projecting teeth and a seat-frame at the rear thereof and hinged with respect thereto, of a shifting-rod in connection with the rake-head, a ratchet-plate at the rear end of said shifting-rod, an operating-lever for effecting the forward and backward movement of the shifting-rod, a pawl carried by said operating-lever for engagement with said ratchet-plate, a spring sustained by and movable with said operating-lever for forcing said pawl into engagement with said ratchet-plate, and a suitable releasing device sustained by said operating-lever, whereby said pawl may be forced out of engagement with said ratchet-plate, substantially as described.

2. In a horse hay-rake, the combination, with a rake-head having forwardly-projecting teeth and a seat-frame at the rear thereof and hinged with respect thereto, of a shifting-rod in connection with said rake-head, an operating-lever for effecting the forward and backward movement of said shifting-rod, a ratchet-plate at the rear end of said shifting-rod, a pawl on the operating-lever for engagement with said ratchet-plate, a spring for forcing said pawl into engagement with said ratchet-plate, and a releasing device for said pawl, comprising a wedge-plate for lifting and holding said pawl and a lever for moving said wedge-plate, substantially as described.

3. In a horse hay-rake, the combination, with a rake-head having forwardly-projecting teeth and a seat-frame at the rear thereof and hinged with respect thereto, of a shifting-rod connected with said rake-head, an operating-lever for controlling the forward and backward movement of said shifting-rod, a ratchet-plate at the rear end of said shifting-rod, a slide-block pivotally connected to the operating-lever and through which said ratchet-plate slides, a pawl for engagement with said ratchet-plate, and a releasing device for said pawl, substantially as described.

4. In a horse hay-rake, the combination, with a rake-head having forwardly-projecting teeth and a seat-frame at the rear thereof and hinged with respect thereto, of a shifting-rod connected with said rake-head, a ratchet-plate at the rear end of said shifting-rod, a pawl for engagement with said ratchet-plate, a releasing device for said pawl, a slide-block for sustaining said ratchet-plate and pawl, an operating-lever whereon said slide-block is pivotally held, and a draw-bolt and ratchet-plate for determining the position of said operating-lever, substantially as described.

5. In a horse hay-rake, the combination, with a rake-head having forwardly-projecting teeth and a seat-frame at the rear thereof and hinged with respect thereto, and a shifting-rod in pivotal connection with said rake-head, of an operating-lever for controlling the forward and backward movement of said shifting-rod, a ratchet-plate at the end of said shifting-rod, a slide-block pivotally connected to the operating-lever and through which said ratchet-plate slides, a pawl for engagement with said ratchet-plate and sustained by said slide-block, and a releasing-lever pivotally connected with said slide-block, the shorter end of said releasing-lever being provided with suitable means for throwing said pawl out of engagement with the ratchet-plate, substantially as described.

HORACE A. ALDEN.

Witnesses:
JOHN E. KIRK,
HENRY P. BLACK.